(12) United States Patent
Farmer (10) Patent No.: US 6,832,156 B2
(45) Date of Patent: Dec. 14, 2004

(54) METHODS AND APPARATUS FOR STATIONARY OBJECT DETECTION

(75) Inventor: Bennie L. Farmer, Ann Arbor, MI (US)

(73) Assignee: Telanon, Inc., Ann Arbor, MI (US)

( * ) Notice: Subject to any disclaimer, the term of this patent is extended or adjusted under 35 U.S.C. 154(b) by 0 days.

(21) Appl. No.: 10/223,865

(22) Filed: Aug. 19, 2002

(65) Prior Publication Data

US 2003/0004644 A1 Jan. 2, 2003

Related U.S. Application Data

(62) Division of application No. 09/633,127, filed on Aug. 4, 2000, now Pat. No. 6,438,491.
(60) Provisional application No. 60/187,942, filed on Mar. 3, 2000, and provisional application No. 60/147,695, filed on Aug. 6, 1999.

(51) Int. Cl.[7] ............................................... B60T 7/12
(52) U.S. Cl. ..................... 701/301; 701/96; 340/435
(58) Field of Search ................................. 701/301, 300, 701/96, 45; 340/903, 435, 436, 403, 904, 555; 342/70

(56) References Cited

U.S. PATENT DOCUMENTS

| 5,319,611 A | | 6/1994 | Korba .......................... 367/98 |
| 5,321,407 A | * | 6/1994 | Kikuchi et al. ............... 342/70 |
| 5,325,097 A | | 6/1994 | Zhnag et al. .................. 342/71 |
| 5,331,561 A | | 7/1994 | Barrett et al. ............... 701/205 |

(List continued on next page.)

FOREIGN PATENT DOCUMENTS

| EP | 0841648 | 5/1998 |
| EP | 0921509 | 6/1999 |
| GB | 9927384 | 11/1998 |
| JP | 61070618 | 4/1986 |
| JP | 2016484 | 1/1990 |
| JP | 3255253 | 11/1991 |

(List continued on next page.)

OTHER PUBLICATIONS

Freightliner Argosy, Safety Concept Vehicle, 1998.
University of Minnesota Publication, dd. Mar. 10, 1999 by Dr. Craig Shankwitz.
Delphi Automotive Systems, Collision Warning Systems dd. 1998.

(List continued on next page.)

*Primary Examiner*—Tan Q. Nguyen
(74) *Attorney, Agent, or Firm*—Scott M. Oldham; Hahn Loeser & Parks LLP (57) ABSTRACT

The present invention provides systems and methods for measuring the likelihood that detected stationary objects are not normally present at a sensed location. Such systems and methods may be used by other systems to which information from the present invention are communicated, for minimizing nuisance alerts in onboard object detection systems such as collision warning, collision avoidance, and/or adaptive cruise control systems. The system includes at least one vehicle mounted sensor capable of sensing at least a target object and providing data related to the target object. The system also comprises a locating device which is capable of determining and providing data related to the location of the machine or vehicle and a processing unit which receives the data from the sensor and the data from the locating device. The processing unit is configured to determine a probability estimate or measure of likelihood that the target object is not a normally present object based upon a comparison to previously recorded data from a reference storage device. The reference storage device stores the previously recorded data acquired from at least one similar sensor and a vehicle locating device while operating in the same geographic area, or stores data derived from such previously recorded data. The invention may enhance vehicle collision warning, collision avoidance and/or adaptive cruise control systems as examples.

29 Claims, 4 Drawing Sheets

U.S. PATENT DOCUMENTS

| | | | | |
|---|---|---|---|---|
| 5,461,357 | A | * 10/1995 | Yoshioka et al. | 340/435 |
| 5,471,214 | A | * 11/1995 | Faibish et al. | 342/70 |
| 5,486,819 | A | * 1/1996 | Horie | 340/905 |
| 5,528,217 | A | 6/1996 | Adams | 340/435 |
| 5,530,447 | A | 6/1996 | Henderson et al. | 342/70 |
| 5,635,844 | A | 6/1997 | Takigawa et al. | 324/642 |
| 5,668,739 | A | * 9/1997 | League et al. | 382/103 |
| 5,797,134 | A | 8/1998 | McMillan et al. | 705/400 |
| 5,999,878 | A | * 12/1999 | Hanson et al. | 701/208 |
| 6,032,098 | A | 2/2000 | Takahashi et al. | 701/210 |
| 6,035,053 | A | * 3/2000 | Yoshioka et al. | 382/104 |
| 6,047,234 | A | 4/2000 | Cherveny et al. | 701/200 |
| 6,073,078 | A | * 6/2000 | Kitahara et al. | 701/300 |
| 6,100,796 | A | 8/2000 | Wagner et al. | 340/435 |
| 6,140,954 | A | * 10/2000 | Sugawara et al. | 342/70 |
| 6,160,479 | A | * 12/2000 | Åhlén et al. | 340/555 |
| 6,161,071 | A | 12/2000 | Shuman et al. | 701/48 |

FOREIGN PATENT DOCUMENTS

| | | |
|---|---|---|
| JP | 4320250 | 11/1992 |
| JP | 7065294 | 10/1995 |
| JP | 8005730 | 1/1996 |
| JP | 8240658 | 9/1996 |
| JP | 9728458 | 1/1997 |
| JP | 9728459 | 1/1997 |
| JP | 9043342 | 2/1997 |
| JP | 10112000 | 4/1998 |
| JP | 10221451 | 8/1998 |
| JP | 10222792 | 8/1998 |
| JP | 11094941 | 4/1999 |

OTHER PUBLICATIONS

Minnesota Guidestar Intelligent Vehicle Initiative Lateral Guidance and Collision Warning 1998–1999 and 1999–2000 Snowplow Demonstration Projects, Marthand Nookala and Stephen J. Bahler for Minnesota Dept. of Transportation.

Creating and Evaluating Highly Accurate Maps with Probe Vehilces, Seth Rogers, 2000.

Learning to Associate Observed Driver Behavior with Traffic Control, Christopher A. Pribe and Seth O. Rogers, Nov. 20, 1998.

ITS Minnesota Industry Forum, Panel on Intelligent Vehicle Initiative, Sep. 16, 1998.

Centimeter–Level GPS for Highway Systems, Jul., 1998, James W. Sinko, Randal C. Galijan and Thanh M. Nguyen.

SRI International Flyer, Real–time Kinematic Global Positioning System, 1999, month not available.

Location–Specific Radar Calibration, Daimler Benz, 1998, month not available.

RS–232 to SAE J1708 Converter, B & B Electronic, Feb. 1997.

World wide Telematics Industry, Eyes on the road and hands on the wheel, Aug. 21, 2000.

Route–related trip Information and XFCD, Telematic at BMW, Dec. 11, 2000.

DDG, Floating Car Data on a Larger Scale, Dec. 11, 2000.

Interview, Bill McIntosh, Finance Director, Trafficmaster, Oct. 17, 2000.

Integration of Driver Support Systems, Kees Wevers et al, date is not available.

Interfaces Definition, In–Arte Project Turkey 4014, date is not available.

The National Intelligent Vehicle Initiative Meeting, Light Vehicle Platform Technical Session, Jul. 2000.

* cited by examiner

METHODS AND APPARATUS FOR STATIONARY OBJECT DETECTION

TECHNICAL FIELD

This invention is related to systems and methods for stationary object detection, including driver situation awareness, vehicle collision warning, collision avoidance and/or adaptive cruise control systems as examples. More particularly, this invention relates to improvements in stationary object detection, and accurately determining the likelihood that a objects detected using an object sensing system are not normally present at a sensed location.

BACKGROUND OF THE ART

Object detection systems can be useful in a variety of environments, including for use in land-based mobile machines and vehicles where there is a threat of collision with the objects. Such land-based mobile machines or vehicles may include subterranean or open-pit mining machines, on-road or off-road vehicles, robotic machines or the like. In the varying environments in which such machines are used, it should be evident that various obstacles and objects are within the possible path of the machine, and wish to be detected and often avoided. For example, vehicles may encounter conditions where there is no visibility of objects within the possible path of the vehicle. Collision warning systems are currently being developed to provide a warning to the commercial and/or passenger vehicle driver whenever an onboard sensor detects that an object presents a potential for a collision. For safety concerns, these systems must use a low threshold in determining whether the identified target object is a potential collision hazard in order to prevent the system from missing a bona fide hazard target. This results in the collision warning system sometimes generating a collision alert in response to non-hazard targets and/or clutter such as "road furniture". Typical non-hazard targets include road signs, bridges, fences, guard rails and road-side burms, etc. These "false" alerts, also known as "nuisance alerts", are an annoyance and can happen so often that the driver may delay reacting or ignore the warning and not react to a bona fide warning. Poor discrimination of such non-hazards from true hazards limits the effectiveness and reliability of such collision warning systems.

There are currently several types of vehicle-based collision warning and adaptive cruise control products for use in commercial and passenger vehicles. The first system is known as Adaptive Cruise Control (ACC). ACC is an enhancement to conventional cruise control which has the ability to detect objects ahead of the moving vehicle when cruise control is engaged to improve the "comfort and convenience" of the system. It is not employed as a safety system as the driver must still pay attention and respond to potential hazards, and is often marketed as simply a "more convenient" form of cruise control, even though some evidence exists that its use offers safety benefits, as well, compared with conventional cruise control. When the ACC host vehicle is cruising at its cruise-control set-speed, the ACC automatically slows down the host vehicle to match the speed of a somewhat-slower-moving vehicle traveling in its lane ahead and establishes an "appropriate" following distance, which in many ACC designs the driver has a role in setting, within defined minimum and maximum distance limits. After that, the ACC enters "distance-control" mode, matching the forward-vehicle's speed (unless it accelerates beyond the host vehicle's set-speed), as long as it is present. If another vehicle cuts in and stays in the lane, the ACC will decelerate the host vehicle to re-establish the "appropriate" distance and then re-enter "distance-control" mode. Whenever the lane ahead clears, due to either vehicle changing lanes, the ACC will cause the host vehicle to smoothly accelerate tip to its cruise-control set-speed and keep that speed until a slower-moving vehicle is again detected in its lane ahead. The ACC typically uses a stand-alone forward-looking sensor system, which can not accurately judge whether a detected object is in fact on the roadway in the host vehicle's lane without generating an unacceptable number of nuisance alerts. Accordingly, it is generally understood in the automotive industry that ACC has been designed not to address this situation, and some ACC systems have even been designed not to respond to moving vehicles in their lanes traveling at speeds slow enough so that the driver might not realize they are moving. The reason for this is to attempt to avoid giving the driver a misimpression that the ACC does or should respond to stopped vehicles, with the result being that such an ACC provides even less functionality than it is capable of providing, due to this human-factors consideration. With an improved ability to sense objects and discriminate stationary objects, an improved version of ACC could developed to provide additional capabilities, such as the ability to respond to all vehicles in the host vehicle's lane, whether moving at normal highway speeds, moving slowly, moving and coming to a stop, or even stationary when first detected.

Another product is known as the Forward Collision Warning System (F-CWS). The F-CWS operates as an advisory system to the driver, who operates the vehicle in the normal way and is still fully responsible for safe operation. Various warnings are given for a wide range of potentially-dangerous situations involving moving vehicles and stationary vehicles or other large objects. Unlike ACC, the F-CWS is designed to operate while the vehicle is under full control of the driver, rather than while cruise control is operating, and also to warn the driver of a wide range of potentially dangerous situations, including those involving stationary objects that are judged by the F-CWS to lie in the expected path of the host vehicle. Due to the difficulty of distinguishing stopped vehicles or other stationary objects in the path of the vehicle, when compared to normal roadside or overhead highway structures, current products of this type on the sometimes warns the driver of a potential collision when there is no hazard, resulting in a nuisance alert. This is widely believed to be a primary reason why such products were first introduced on commercial vehicles, and have not been introduced on passenger vehicles, even in markets where the commercial vehicle products are currently in use (including the United States). Although an occasional nuisance alert can be an annoyance to a professional driver operating a commercial vehicle, such drivers are generally provided specific training on the use and limitations of these products, and with their extensive driving experience, often simply regard the occasional nuisance alert as a minor distraction. However, there is wide concern that passenger vehicle drivers, who may have much less driving experience and who cannot generally be required to undertake product-related training similar to commercial drivers, may react unpredictably to any nuisance alerts generated in error by a safety-related product such as F-CWS. Various approaches have been used in attempts to minimize these nuisance alerts. One such approach involves delaying an eventual warning while more information is taken to evaluate the probable location of a detected stationary object and the expected location of the host vehicle's line ahead. If the stationary object does not seem to be in the projected host vehicle's lane, it is usually judged not dangerous. On the other hand, if the object is confirmed as a hazard, the warning will be delayed. This will allow the driver less response time to avoid the collision with the object. At the same time, the viewing angle of the sensor system may be purposely limited to help reduce nuisance alerts, which may limit the effective capabilities of the system.

Although attempts have been made at improving the sensor to better identify objects, such sensors have not resolved the problems to date or are too expensive for incorporation in commercial or passenger vehicles. Infrared laser sensors have been developed which provide both horizontal and vertical scanning, and which give detailed object sensing resolution; however, such sensors to date have had difficulties operating acceptably in foul weather and with respect to objects whose reflectivity may be significantly reduced by ice, snow, or even road grime. Radar technology may overcome much of these environmental problems; however such radar products that provide both horizontal and vertical scanning require so much hardware and software to operate that they remain much too expensive for commercial and passenger vehicle use. Current radar-based commercial or passenger vehicle products can provide limited information about detected objects: distance, relative speed, and horizontal position (sometimes including estimated horizontal width). None of them offer information about the vertical position of a detected object, which can lead to uncertainty at all but very close range whether an in-path detected object is actually in the vehicle's path or is simply an overhead structure. Other attempts to improve the current F-CWS technology utilizing stand-alone sensors have not resolved the production of nuisance alerts, particularly in locations where sharp curves, low bridges, tunnels, and/or hills cause the system to mistakenly regard the detected stationary objects to lie oil the roadway in the host vehicle's path. The present state of the art for vehicle use does not have the ability to reliably detect whether a detected stationary object is it road level or is perhaps simply an overhead object such as a low bridge or tunnel opening. The ability to precisely locate a stationary object detected ahead to be at the horizontal coordinates matching the host vehicle's lane is not adequate to determine whether the object is in the roadway or overhead.

The only existing forward-looking collision warning system in commercial use in the United States utilizes Doppler-based modulation for its radar sensor. Doppler processing is based on identifying objects by detecting the change in frequency between an emitted signal and a return signal reflected back from the detected object, and this "Doppler shift" relates directly to the detected object's speed relative to the sensor's transmitting antenna. With modern digital radar signal processing, typically using fast Fourier transform (FFT) methods, such radar sensors are designed to separate all detected objects into a number of separate "Doppler bin" categories, based on their Doppler frequency shift, and thus speeds relative to the sensor. The design of typical sensors used for vehicle-based ACC and CWS typically can identify an object separately from others if its relative speed is only a few tenths of a mile per hour different from the rest. In practice, this has proven very effective overall for these systems, but one result is that, with some exceptions for objects nearer the edges of the radar beam, all stationary objects detected within the radar beam appear to be moving at the same relative speed (they are fixed and the vehicle is moving towards them at some speed). Such Doppler-based radars are extremely accurate with respect to relative speed, as well as for distance (and horizontal angle, depending on the antenna design) to individual objects. However, for stationary objects, the distance and horizontal angle (if provided) are calculated for all objects whose relative speeds place them in the same Doppler bin, and for stationary objects, this results in distinct objects not being recognized as such, and the apparent distance and horizontal angle to a significant stationary object can be strongly influenced by other stationary objects within the radar beam. Because the radar beam is typically no more than 12 degrees wide and 4 degrees high, a fairly small amount of the stationary environment influences the results, but since the "reflectivity" or radar cross section (RCS) of an object and its nearness to the sensor are strong influences, the "apparent" location of an individual object when first detected is not only not precisely accurate with its physical location (because the result is being influenced by other stationary objects), its "apparent location" changes, often moving closer to the sensor, as the sensor approaches the object. This is due to the fact that the individual object takes up more of the radar beam as it is approached, so it has greater influence than at greater distance. Further, the distance itself is a strong influence on the radar return, so as it is approached, its smaller distance also gives it more influence on the calculations for the location of it as well as all other objects in its Doppler bin. The net effect is that individual stationary objects can only be precisely located when they are fairly close to the Doppler-based radar sensor, and at varying distances, their "apparent locations" appear to move in space as they are approached.

Another potential product is the Short-range Collision Waning System (S/R-CWS). At present, a convenience-oriented product generally called Parking Aid is available on vehicles, which is a limited-function parking assistance system, generally utilizing ultrasonic sensors to warn the driver when the host vehicle is getting too close to another object in the rear or front while parking. These systems only need to operate over very short distances and for very slow speeds. Most vehicles have significant blind spots immediately to the rear, and many commercial vehicles have a blind spot immediately ahead, so a S/R-CWS designed to alert the driver to any dangerous situation, especially while the vehicle is moving in reverse, must meet difficult design requirements. It must reliably and quickly detect people, especially small children, who may be playing or otherwise be behind the vehicle without the driver's knowledge. It must provide warnings to the driver for such detections with adequate time for the driver to respond, while the vehicle is moving at normal speeds for maneuvering in parking or work areas, or backing down a driveway. To do so, and to reduce the potential for missed detections to an absolute minimum for safety reasons, it is difficult to design such stand-alone systems with current technology without having a significant potential for nuisance alerts. To be an acceptable product, it must have very few nuisance alerts, or else risk having the driver ignore critical alerts in areas where nuisance alerts might occur.

Although not discussed in detail, there are other collision warning systems which are also susceptible to nuisance alerts. Conquering the problems associated with nuisance alerts in such systems will not only allow greater deployment and acceptance of the ACC, F-CWS and the S/R-CWS and other related systems, but will also allow for the introduction of advanced collision avoidance systems. The collision avoidance systems have the ability to not only warn the driver, but will also take action to help avoid the collision such as slowing or stopping the vehicle. These systems have the potential to reduce collisions and improve driver safety, beyond the improvements possible with ACC, F-CWS, and S/R-CWS products. Additionally, in a variety of other environments, such as in the use of mobile machines such as robotic vehicles or the like, reliable object detection is essential, and similarly, the accurate measure of whether a sensed object is normally present at a sensed location will facilitate operation of such machines, in some cases to avoid the object but in other cases to investigate it.

Therefore, there remains a need in the art for a method and apparatus for accurately measuring the likelihood that detected stationary objects are normally present in an environment at a remotely sensed location. Such improved measuring capabilities would in turn improve suppression of nuisance alerts in such systems as adaptive cruise control and/or collision warning and/or collision avoidance systems. Such improved measurement would also enable sensing systems to operate at their fullest effective range and ability.

SUMMARY OF THE INVENTION

To overcome the above indicated problems, the present invention provides systems and methods for determining the likelihood that stationary objects detected by a sensor in a geographic area are unusual, based on comparing remotely-sensed characteristics of those objects with characteristics detected by similar sensors operating with locating devices in the same geographical area on previous occasions. This invention is equally applicable to all known sensor technologies, including Doppler-based radar, because the characteristics of detected stationary objects, including apparent relative location, detected from a particular vehicle location are compared with characteristics detected on previous occasions by similar technology sensors operating at the same vehicle location; as a result, "apparent location" of stationary objects calculated from a vehicle location is compared with a similarly-calculated "apparent location" using detection by similar technology sensors from the same vehicle location. This approach has significant advantages, compared with comparisons between calculated absolute position based on "apparent location" calculated from Doppler-based sensor data and actual physical location recorded in a navigation-based map database, however detailed and accurate. In addition, the present invention offers advantages for non-Doppler-based sensor systems, due to the fact that it provides signal return comparisons, in addition to possible other characteristics detected on previous occasions by similar sensors, which give information in addition to location to help distinguish the presence of multiple stationary objects which appear to be at the location of an object which is normally there. This helps reduce the uncertainty of comparisons based solely on location-matching when location precision better than 1 meter is unavailable. Compared with the use of a navigation-based map database and similar sensors, the present invention also addresses the difficulty of reliably detecting whether a stationary object is at road level or overhead, by providing the ability to compare the signal return strength with what should be normal from each point in the approach path; in the case of a stationary vehicle beneath a low overhead structure, the relative locations will match the normal ones as the vehicle approaches, but the return signal magnitude should be greater than normal, due to the presence of the roadway-level object which is returning the signal ill addition to the overhead structure which would normally be the only stationary object at that location returning the signal.

Such systems and methods may be used for minimizing nuisance alerts in onboard object detection systems such as collision warning, collision avoidance, and/or adaptive cruise control systems. The system includes at least one vehicle mounted sensor capable of sensing at least a stationary target object and providing data related to the target object. The system also comprises a locating device which is capable of determining and providing data related to the location of the machine or vehicle and a processing unit which receives the data from the sensor and the data from the locating device. The processing unit is configured to determine a probability estimate or measure of likelihood that the target object is not a normally present object or is otherwise unusual, based upon a comparison to previously recorded data from a reference storage device. The reference storage device stores the previously recorded data acquired from at least one similar sensor and a vehicle locating device while operating in the same geographical area where the target object is being detected, and/or data derived from such previously recorded data.

It is an object of the present invention to provide a system which will reliably evaluate whether a target stationary object is unusual based on its remotely-detectable characteristics, and is therefore a bona fide object, such as a potential collision object, at a distance up to the operating distance limit of the sensor.

It is another object of the invention to provide such evaluation of a target stationary object to a collision warning system to improve its decisions whether and how to alert the driver, and to an avoidance or ACC system to improve its decisions whether and how to alert the driver and how to control the vehicle. In this manner, the invention assists the identification of bona fide hazard targets and the suppression of collision warnings produced in response to various non-hazard targets and/or clutter commonly encountered in the operating environment of many land-based vehicles.

It is another object of the invention to provide a vehicle's driver or a mobile machine's remote operator with improved situation awareness of unusual stationary objects, to allow the driver or operator to begin evaluating the situation, possibly in advance of alerts or other actions initiated by collision warning, ACC, or collision avoidance systems. This is normally done by identifying to the driver or remote operator the location of detected stationary objects which are not normally present or which for other reasons are sufficiently unusual. Since a collision warning, ACC, or collision avoidance system may require more time to sufficiently evaluate whether the unusual stationary object may also be hazardous, it is very possible that the driver will receive such situation awareness information before another system provides alerts or takes any other type of action. If the driver or operator agrees that objects identified by the situation awareness information do appear to be unusual, even if not dangerous, then such unusual but non-hazardous object identifications should not be considered "nuisance alerts", and should not reduce the effectiveness of the invention. An example of such a situation is a car parked in an emergency lane adjacent to the host vehicle's lane, but too far away for a collision warning or collision avoidance system to determine with acceptable confidence whether it is in the host vehicle's lane. If called to the driver's attention as an unusual stationary object, the driver should quickly realize that there is no little to no danger, but may still appreciate the situation awareness message, so the driver or operator could begin changing lanes or simply watch more closely in case someone is near the car who might not see the approaching host vehicle and step into the lane. Such situation awareness information would normally be expected to work in conjunction with an associated collision warning, ACC, or collision avoidance system operating, but in some cases may operate as a stand-alone capability without full collision warning, ACC, or collision avoidance systems actively engaged or even present.

DETAILED DESCRIPTION OF THE INVENTION

The present invention provides a system which uses a statistics-based algorithm to determine whether one or more stationary objects noted by a sensing system are normally present objects or otherwise possible obstacles in the vicinity of the mobile machine or vehicle on which the system is used, whether intended to alert the operator or otherwise control operation of the vehicle to avoid objects in this vicinity. Although the invention will be described with reference to collision warning systems (CWS), collision avoidance systems (CAS) and/or adaptive cruise control (ACC) systems, it should be understood that the improved ability to detect the presence of target objects, whether expected or unexpected, may be used to improve many vehicle or machine applications in addition to these applications. The invention provides the additional capabilities of allowing proper identification of hazards, and allowing appropriate action to be taken earlier than possible without the subject invention or up to the greatest capacity of the object sensing systems.

While the following discussion refers primarily to CWS, it is understood to include CAS, ACC, or any other related system. The sensor employed by the system often limits the performance of any detection or collision warning system. There are generally three categories of sensors; visible light, laser and radar. The visible light sensors typically use CCD technology to capture the road scene ahead of the vehicle. Also known as "vision sensors", they can provide a great deal of detail to be used in identifying objects and locations. However, the technology is currently costly and does not work well in adverse weather conditions.

The laser sensors employed in a collision warning system typically operate in the infrared spectrum. Generally, an inexpensive laser diode generates the radiation, which is then shaped and scanned by various methods over the area of interest. Returning radiation is captured through lenses, and the intensity of the radiation can be measured. By pulsing the laser, highly accurate distances can be determined by elapsed time calculations. These distances include the distance away, angle up-and-down from dead center, and angle side-to-side from dead center. While laser systems are inexpensive and provide excellent object location capability, their performance also deteriorates in adverse weather conditions and due to foreign materials such as road grime on the surfaces such as tail lights and license plates, which would normally reflect enough of the infrared radiation to allow reliable detection.

Radar systems use radio frequency electromagnetic radiation for the detection of objects and are typically divided into either microwave or millimeter wave frequencies. The radar systems have the ability to operate in a much wider range of adverse weather conditions without any degradation in performance than is possible with sensors such as those described above, which operate in the visible light or infrared spectrums. However, the radar systems are generally more costly and must employ even more costly radar imaging technology (i.e. vertical/horizontal scanning radar, synthetic-aperture radar) to achieve the same level of object resolution available with the vision or laser systems. As a result, current affordable radar-imaging systems provide distance and side-to-side position (azimuth angle) information for detected objects, but no explicit up-and-down (elevation angle) information.

Current radar systems utilized on land vehicles use one of three major methods for modulating radar signals: pulse Doppler; frequency modulated continuous wave (FMCW) ramp; and frequency shift key (FSK). The modulation is typically combined with signal direction techniques. While the preferred direction technique is a horizontally- and vertically-scanned narrow beam, this is currently cost prohibitive, except for laser based sensors. The typically used techniques include horizontally-scanned which can give accurate results, but no vertical data; switched-beam which generally gives less accurate results, and no vertical data; and horizontal monopulse which generally gives more accurate results, but again, no vertical data. It should be recognized that as technology in these systems improves and become less expensive, many of these difficulties may be overcome to provide additional capabilities.

Pulse Doppler modulation works similar to laser pulse to directly calculate an accurate distance to an object using elapsed time calculations. To reduce necessary processing, detected objects are generally sorted into distance ranges of a set amount chosen for the design, called "distance bins"; for vehicle radar, one meter is typically chosen for the "distance bin" size. A chosen transmit frequency is periodically pulsed for a very brief time to a higher frequency, and then back to the original transmit frequency. Returning signals can be processed into separate "distance bins" of objects, within which objects are processed into various Doppler "bins" to separate out objects moving at different speeds relative to the sensor.

The FMCW ramp method uses time-varying changes in frequency which allows accurate distance and relative speed to be calculated for observed objects, based on changes in the modulation pattern in the returned versus broadcast signals. With this approach, moving and stationary individual objects can typically be identified as individual, separate objects based on their distances and horizontal locations.

FSK is a simple version of FMCW which alternates frequencies between two or more frequencies over time in a step function. Distance and speed are determined independent of each other. This technology is typically used in conjunction with a monopulse direction technique comprising an antenna which uses a single transmit and two overlapping receive beams to derive the azimuth angle of each detected object. The measurement of distance, speed, and azimuth are very accurate with this system. However, since FSK is a Doppler-based technique and recognizes individual objects based on their relative speeds to the sensor, everything moving at the same speed (within a set narrow range) is considered to be the same object. This means that the distance and azimuth angle to each object is accurate for the centroid of everything observed by the radar with the same relative speed. For moving vehicles, this is usually umimportant as no two vehicles can match speeds closely enough to be confused. However, for stationary objects, since they are "moving" (relative to the sensor on the moving vehicle) towards the vehicle at the same speed as the rest of the stationary world, they are not detected as separate objects apart from their stationary surroundings. An individual roadside object will influence the distance and azimuth angle calculations to a greater degree if its radar-cross-section (RCS) is large, compared to its stationary surroundings, and if it is closer to the vehicle than its stationary surroundings (at least in the view of the radar sensor, which only detects within its narrowly-focused beam). The result is that the accurate locating capability of an FSK/monopulse sensor is somewhat limited for locating an individual stationary object in a cluttered stationary environment, at least unless/until the vehicle is close enough so that the object of interest is the only (or at least the most radar-return significant) object within the beam. This situation is also true of pulse Doppler processing, for objects processed into a given "distance bin" which are also moving at the same relative speed.

The present invention is designed to work with any of the above-described sensors, including those involving Doppler processing, which typically cannot separately identify stationary objects in the same "Doppler bin". Due to the potential complications posed by Doppler processing of stationary objects, the discussion will focus on the behavior of the present invention when used with a Doppler-based sensor system.

For a vehicle with an installed outward-looking sensor system, if the same path is taken repeatedly, and the same stationary objects are present, then (within some statistical scatter) the objects' characteristics detected by the sensor from each given point along the path should be consistent and repeatable each time the same path is driven. These characteristics can include, but are not limited to, range, azimuth angle, signal return strength, and/or elevation angle. Also, the characteristics detected by the vehicle's sensor system along that path should change if stationary objects are added or removed from the observed area. Specifically in the case of a Doppler-based radar sensor, the amount of change, however, will depend on bow much influence the added (or removed) object has, in terms of relative RCS and relative position compared with other radar-reflective objects within the radar's beam. With a Doppler-based sensor, the addition of a new stationary object may not result in an additional object being identified as such. However, one or more characteristics detected for stationary objects in the nearby area along the path should change, and the significance of the changes in the detected characteristics can be examined to estimate the likelihood that an unusual stationary object is indeed present. According to the present invention, the data from the multiple passes by vehicles with similar sensors are stored and used to create a reference database which is accessed for comparison any time the vehicle encounters the same path. Any of the above sensor systems or new sensing systems which may be developed can be used to create the reference database of the invention as will be described in detail below.

The following preferred embodiment of the present invention illustrates its use with a Doppler-based radar sensor system with only a single stationary "target object" detected along a travel path, which due to the Doppler-type processing as described above, may actually include more than one actual stationary object which are simultaneously detected within the radar beam, but whose near-identical speeds relative to the moving host vehicle result in their sharing the same "Doppler bin" during processing. As explained below, the phenomenon of "apparent position" of the detected stationary "object" moving in space as the host vehicle approaches the actual physical objects is not a problem for the present invention, since it never attempts to compare the absolute physical location of any of the individual physical objects with a calculated absolute position for the detected target object(s). Although a single target object is used for illustration, the detected presence of multiple target stationary objects is also easily handled by the present invention by simultaneously evaluating the multiple detected stationary objects against the reference database for the vehicle's present geographic area. This is true for multiple target objects detected simultaneously from a particular host vehicle location, whether by a Doppler-based sensor with objects whose relative speeds due to their positions in the radar beam differ enough to fall into separate Doppler bins for processing, or by non-Doppler-based sensors capable of detecting separate stationary objects as individual objects. Further, the comparison of multiple characteristics of a stationary target object detected by a sensor system with data stored in a reference database derived from detections by similar sensors operating with locating devices in the same geographical area on previous occasions is a technique which works with all types of sensor technologies, and which offers advantages over comparisons based on location comparisons alone.

Figure 1:
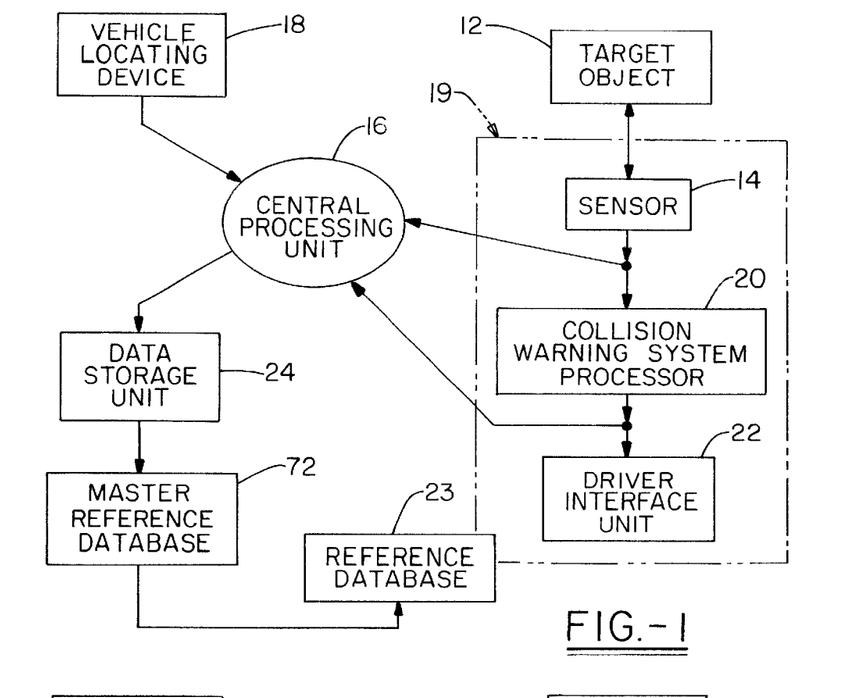
FIG. 1 is a block diagram depicting the creation of a reference database of the present invention.
Figure 2:
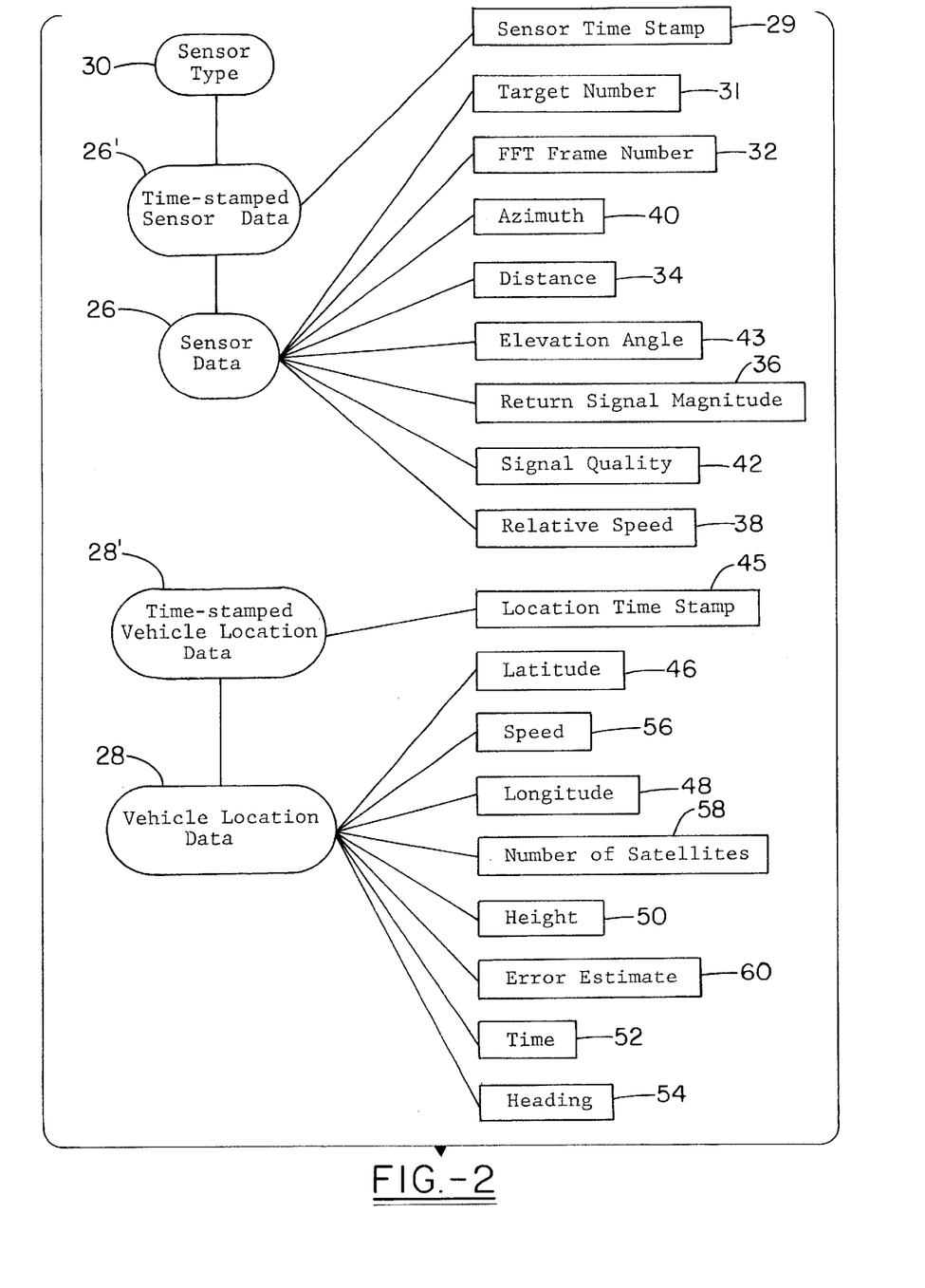
FIG. 2 is a block diagram showing the sensor data and vehicle location data and individual elements associated therewith in accordance with the present invention.

Referring now to FIG. 1, a block diagram is shown detailing how a reference database 23 is created from multiple passes by a vehicle or mobile machine over the same path, such as a road segment, having at least one target object 12. The target object 12 may, in the example of a collision warning system (CWS) 19, normally create a nuisance alert to the operator of the host vehicle. A collision warning system normally consists of a sensor 14, collision warning processor (CWP) 20, and driver interface unit 22 connected by a common communications data bus as shown. Referring to FIGS. 1 and 2, the sensor 14 identifies the target object 12 as the host vehicle approaches. The sensor 14 sends sensor data 26 related to the target object 12 to the CUP 20. In normal operation, the sensor 14 transmits the sensor data 26 on a periodic basis (generally many times per second) to the CWP 20 which determines if an alert for the driver should be generated in response to the target object 12. In this configuration, the host vehicle has a central processing unit 16 or equivalent processing capability, with software to "time stamp" incoming data messages immediately upon arrival, insert a sensor type 30, consistent with the type of sensor 14 being used, after the "time stamp" for each sensor data 26 message, and provide for storage, except for certain measurement block data 61 that may be transmitted by vehicle location device 18, as will be described. By time-stamping all appropriate arriving messages, using either actual time or the value of a high-frequency counter, the individual messages can later be analyzed with respect to their relative times of arrival, allowing sensor data 26 to be accurately related to location data 28 by their relative times of arrival at central processing unit 16. The central processing unit 16 is linked to a collision warning system's data bus with necessary protocol conversion to allow it to monitor the CWS's messages from the sensor 14 to the CWP 20 and from the CWP 20 to the driver interface unit 22, also known as a man-machine interface (MMI). The data messages 26 from the sensor 14 are captured, immediately time-stamped by appending onto the beginning of the data message the current timer value available to central processing unit 16, with that becoming sensor time-stamp 29, then inserting a sensor type 30 consistent with the type of sensor 14 being used, and temporarily stored by the central processing unit 16 in a data storage unit 24 as time-stamped sensor data 26'. At the same time, a vehicle locating device 18 transmits location data 28 to the central processing unit 16 on a periodic basis (generally once per second). Unless location data 28 is measurement block data 61, it is also immediately time-stamped by appending onto the beginning of the data message the current timer value available to central processing unit 16, with that becoming location time-stamp 45, and temporarily stored by the central processing unit 16 in the data storage unit 24 as time-stamped vehicle location data 28'. If location data 28 is measurement block data 61, it is sent without being time stamped to be temporarily stored by the central processing unit 16 in the data storage unit 24. However, whenever a stationary-object alert is sent to the MMI 22 by the CWP 20, the temporarily stored measurement block data 61, time-stamped sensor data 26' and time-stamped location data 28' (representing a set period of time leading up to the detection of the target object) and the live measurement block data 61, sensor data 26 and location data 28 are stored into permanent memory in the data storage unit 24 for a set time period past the end of any related stationary-object alerts, with location data 28 being converted into time-stamped location data 28' and sensor data 26 being converted into time-stamped sensor data 26' before being stored, as described above. In a preferred embodiment, central processing unit 16 contains software with decision logic which also evaluates whether the target object 12 would generate a stationary-object alert if the host vehicle were traveling at a higher speed up to a maximum level anticipated for vehicles in the current location; this would allow the vehicle capturing data to identify objects which could generate a stationary-object alert at a higher, and perhaps unsafe, speed without being required to actually attain that speed itself. In another preferred embodiment, the central processing unit 16 also contains software with decision logic which also evaluates whether the target object 12 has characteristics that do not make it a hazards but which may cause a smaller stationary object that could be hazardous to be ignored by the CWS 19 system; in that case, it would capture data for object 12 for use in that regard.

Sensor data 26 is captured from the time the target object 12 was first detected until the closest point the vehicle came before passing by the target object 12. Referring now to FIG. 2, the sensor data 26 in a preferred embodiment comprises a target number 31, a fast Fourier transform (FFT) frame number 32, a distance 34 to the detected object(s), a radar return magnitude 36, relative speed 38 of the target object 12, an azimuth angle 40 to the detected object(s), and a signal quality measure (M of N) 42. It is also anticipated that object width 41, an elevation angle 43, and/or object height 44 could be transmitted from a sensor having the capability.

In addition to the sensor data 26, vehicle location data 28 is captured from the time the target object 12 was first detected until the closest point the vehicle came before passing by the target object 12. The vehicle location device 18 may comprise a global positioning satellite (GPS) receiver to provide GPS-based location data to associate with the sensor data. The location data comprises a latititude 46, a longitude 48 and a height 50 for the vehicle, a precise time for which the location is valid 52, a heading 54 and a speed 56 of the vehicle. It is also contemplated that additional data can be obtained such as the number of satellites 58 used and a corresponding error estimate 60. It is further contemplated that messages containing measurement block data 61 may be available from a GNSS-based vehicle location device 18, as explained below.

The vehicle location device 18 typically comprises a global navigation satellite system (GNSS) receiver such as a Global Positioning Satellite (GPS—U.S. satellites) receiver, a GLONASS (Russian satellites) receiver or a combined GPS/GLONASS receiver, but other developed systems could also be used. At this time, the most accurate positioning technology generally available for vehicles utilizes differential global positioning satellite (GPS) signals. A national radio-beacon based service is being developed by the United States government, called the National Differential GPS (NDGPS) system, with anticipated use by land vehicles and with a design goal of offering 10 meter or better positioning capability anywhere in the United States when fully deployed within several years. Another differential GPS service named the Wide Area Augmentation Service (WAAS) is also being developed by the United States government, primarily for aircraft use for Category I landings. This service, which will also be available within the next several years, is designed to offer 7.6 meter or better accuracy, and is provided via geostationary satellites broadcasting directly to GPS receivers over the same frequency used by the GPS satellites themselves. Preliminary results show that better results than the design goal may be possible for both systems, down to 2–3 meters accuracy with sophisticated GPS receivers designed to utilize those services. There are also certain commercial services which offer differential GPS corrections, with some claiming accuracies of approximately 1 meter with sophisticated GPS receivers. A significant increase in accuracy is available with even more sophisticated GPS processing using carrier phase differential corrections. The versions which allow operation from a moving vehicle with immediate results are called real time kinematic (RTK) products. These products can provide decimeter and even centimeter accuracy, but require the existence of a nearby GPS receiver and broadcast capability to the host vehicle. This technique is used in limited areas with some success, but broad use would require an extensive network of these stations, along with more sophisticated dual-frequency GPS receivers in the host vehicles themselves to allow quick accuracy recovery after satellite loss-of-lock when passing under overhead obstructions. While such a network would be feasible, only limited-area networks are known to exist or be planned in the United States. Further, even with the existence of such carrier-phase differential GPS corrections network, the associated dual-frequency, RTK GPS equipment required in the host vehicles may be more expensive than the single-frequency GPS technology currently available for use with existing commercial sources of differential GPS corrections and planned broadly-available NDGPS or WAAS.

Improved accuracy is available by such devices designed to utilize any of several available differential GPS correction techniques that operate in real time. Such differential correction techniques include National Differential GPS differential corrections, Wide Area Augmentation Service (WAAS) differential corrections, or the use of Real-time Kinematic (RTK) techniques utilizing broadcast data from a compatible base station GPS receiver. The greatest accuracy during real time operation is currently available through RTK processing, but no broad network comparable to NDGPS or WAAS exists in the United States for it, and it requires more sophisticated and expensive GPS receivers to operate effectively than the other approaches, especially where frequent satellite blockage due to bridges, foliage, and/or tall buildings make use of dual-frequency receivers necessary to maintain acceptable high-precision operation. It is also contemplated that the measurement block data 61 data messages, if transmitted by vehicle location device 18, can be post-processed with appropriate GNSS data from another source to provide greater location accuracy. Typical post-processing correction techniques include use of data available from the United States Government's Continuously Operating Reference Station (CORS) network, or data from another GPS receiver operating as a base station configured to record compatible GPS data for such purposes.

Some vehicle locating devices use an inertial navigation unit (INU) on-board the host vehicle or some other on- or off-board equipment utilizing "dead reckoning" or similar technique with access to necessary data on vehicle motion. It is also contemplated that the vehicle location data can be obtained using a combination of satellite and inertial navigator systems in a vehicle navigation system.

It is also contemplated that other locating devices which are not vehicle-based may be present with the driver in the vehicle and serve as the vehicle locating device while in the host vehicle. Such devices include cellular telephones utilizing built-in GPS capabilities and/or cellular telephone network-based location techniques, personal digital assistant devices with built-in GPS capabilities, and other types of portable devices with built-in location capabilities.

It is further contemplated that in addition to the highest-accuracy primary vehicle locating device available, that other location devices may be utilized in cases when their performance is available and at least temporarily more accurate than the primary vehicle locating device. An example of this would be a single- or dual-frequency GNSS receiver utilized as the primary vehicle location device, with a vehicle navigation system, cellular telephone, or personal digital assistant available for backup for periods when temporary satellite blockage reduces the GNSS receiver's position.

In order to reduce storage of unnecessary information, the data storage unit 24 comprises one or more temporary buffers (not shown) to store sensor data 26 and location data 28. Only sensor data 26 and location data 28 related to stationary objects responsible for the stationary-object alert warning are saved in permanent storage (not shown) of the data storage unit 24. When one buffer fills, another buffer is emptied and data 26, 28 are stored there. Whenever a stationary-object alert is sent to the MMI 22 by the CWP 20, the contents of the non-active buffer are stored into permanent memory, then the active buffer's contents are stored into permanent memory, and the "live" data 26, 28 being captured is stored into permanent memory for a set time period past the end of any related stationary-object alerts.

Figure 3:
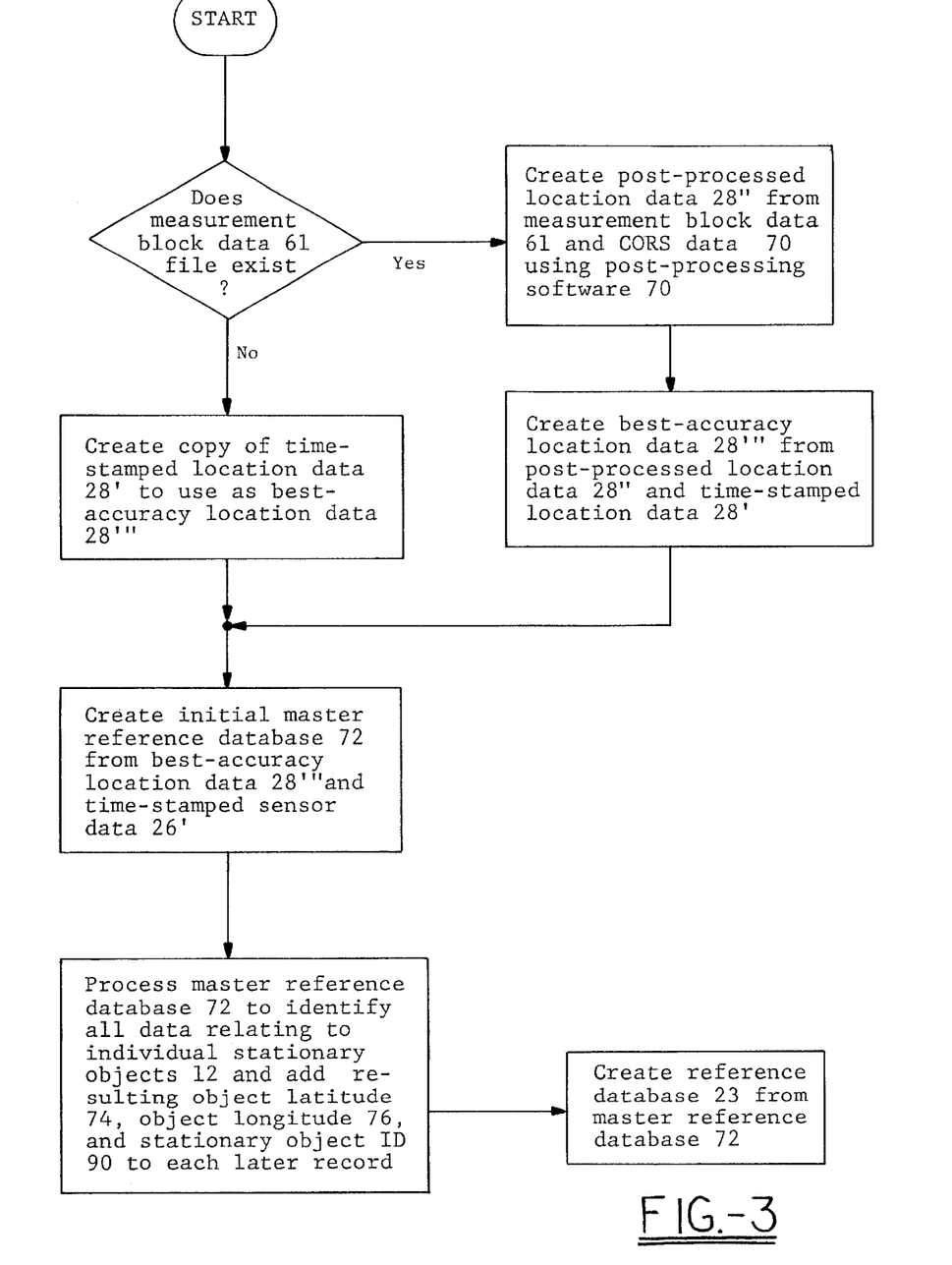
FIG. 3 is a block diagram showing a reference database and individual elements associated therewith in accordance with the present invention.

Referring now to FIG. 3, the data 26', 28', 61 thus captured are then post-processed to form the reference database 23. If measurement block data 61 are available, then the file containing that data is post-processed along with CORS data files 70 or similar data using post-processing software 71 such as NovaTel SoftSurv or equivalent. The CORS data files 70, which are available from various CORS stations throughout the United States through the CORS web site, should be selected for the time periods during which the CWS 19 was operating and from stations as close to the geographic area where the CWS 19 was operating, to provide the best post-processed location accuracy. Various utility programs are also available through the same web site to decompress the downloaded files and interpolate the results to better match the data frequency of the measurement block data 61. The result of the post processing, after selecting the desired data from the output, is location data 28", which matches location data 28', except that it has no location time-stamp 45, and that for periods in which differential GPS corrections were possible, its position accuracies are more accurate, indicated by having lower horizontal position error 60 values for data taken during those periods. A best-accuracy location data 28''' file is then created by replacing the values for location data 28' with the values found for data records with matching precise time 52, if the horizontal position error estimate 60 is lower in the data record in the file location data 28". Note that location time-stamp 45 data should not be altered, and should exist in time-stamped best-accuracy location data 28''' after this process for each data record.

The next step in post processing, as shown in FIG. 3, is to create a master reference database 72 from time-stamped best-accuracy location data 28. and time-stamped sensor data 26'. Starting with the first sensor data 26' record, the following process should be performed to create the corresponding master reference database 72 record, until all sensor data 26' records have been processed. Using sensor time-stamp 29, find the best-accuracy location data 28''' record whose location time-stamp 45 is closest to the same value. Then, using interpolation/extrapolation calculations, use values for latitude 46, longitude 48, height 50, precise time 52, heading 54, speed 56, number of satellites 58 and horizontal position error 60 from the chosen best-accuracy location data 28''' record and an adjacent one, to calculate latitude 46', longitude 48', height 50', precise time 52', heading 54', speed 56', number of satellites 58', and horizontal position error 60', consistent with a location time-stamp 45 value matching the chosen time-stamped sensor data 26' record's sensor time-stamp 29 value. Now, create the first data record in master reference database 72 with the following: latitude 46', longitude 48', height 50', precise time 52', heading 54', speed 56', number of satellites 58', horizontal position error 60', sensor type 30, target number 31, FFT frame number 32, distance to detected object 34, radar return magnitude 36, relative speed 38, azimuth angle 40, signal quality 42, object width 41, elevation angle 43, and object height 44. The resulting master reference database 72 consists of every stationary object data point detected by the sensor 14 for a geographic area in which stationary objects 12 of interest were being detected, with all their observed characteristics recorded and indexed to the most-precise latitude/longitude/height position of the CWS 19 system available, along with the precise time that each observation was made. This master reference database 72 is designed to hold all data gathered for use by the present invention, and is used in the following steps to create the reference database 23 used by the present invention during real time operation, as will be shown below.

The next step will use analytical methods to reduce the master reference data 72 to key relationships and statistical measures of data distributions. First, select all records for a particular sensor type 30. It is important not to mix results from different types of sensor 14, unless it is validated that results from certain different sensor types are consistent; this is because characteristics of objects are detected differently by various types of sensors. Second, for those records, to help identify all master reference database 72 relating to an individual stationary object 12, calculate the latitude and longitude for each stationary object 12, using the last observation in each observation sequence to benefit from the greater location accuracy provided by some types of sensors at close range. An approach to accomplish this is to sort the records using two sort keys—the primary key should be target number 34 and the secondary key should be precise time 52'. In that order, the last-occurring (that is, the one with the highest value of precise time 52') record for each value of target number 31 should have the calculation performed. The calculation for object latitude 74 involves the values for latitude 46', heading 54', distance to object 34, and azimuth angle 40, plus conversion factors A and B to convert from the units of measure used for distance to object (typically feet or meters) and units of measure for the two angles (either degrees or radians) into measurement units for latitude and longitude, respectively. (Since the conversion from linear measurement to changes in longitude also depends on the local latitude, since lines of longitude converge as one moves away from the equator and towards either pole, a more accurate alternative is to receive the GPS-oriented X, Y, and Z location values which are typically in meters, rather than latitude, longitude, and height; in this way, the GPS receiver performs an accurate conversion before providing the figures.) The first equation is object latitude=latitude+A×(distance to object×cosine(heading+ azimuth angle)). The calculation for object longitude 76 involves the same data items, with that equation being object longitude,=longitude+B×(distance to object×sine(heading+ azimuth angle)). Once the object latitude 74 and object latitude 76 is calculated for the last data point in each sequence, all records in that sequence should have the just-calculated values for object latitude 74 and object longitude 76 entered into their data records. Once all data sequences have been processed in this way, resort the database using object latitude 74 and object longitude 76 as the two sort keys. (It doesn't matter which is the primary one—the object is simply to group the data files based on combinations of object latitude and object longitude.) Even though the values for object latitude 74 and object longitude 76 will only be exactly the same, even for the same stationary object 12, for the records in a given observation sequence, the differences in values for object latitude and object longitude among records that observed the same stationary object 12 should be much smaller than those between observations of different stationary object 12 items. In the preferred embodiment, the final step in properly classifying each record according to the particular stationary object 12 it observed is to apply the following automated procedure: utilize a simple database routine or spreadsheet macro routine to start with the first record in the above sequence and calculate the difference in object latitude between it and the next record, as well as the difference in object longitude between the first and the next record. Temporarily store both differences, and now calculate similar differences between the third record and the second one. If either of the second set of differences is not greater than some factor (perhaps 2, but this should be "tuned" based on results), then repeat the process with the next pair of records. Continue this until the calculated difference between a record and the last one is greater than the chosen factor times the stored value for object latitude difference or object longitude difference. At that point, generate a unique stationary object ID 78 value, assign it to all records just processed, but not including the record with the greater difference. Then repeat the process, treating the next record as the very first one was handled. With a little experience, this technique should assign a unique stationary object ID 78 to all records with observations for the same stationary object 12. Another routine should check for unusually small numbers of records assigned to a given stationary object ID 78, and generate reports on such records for human review and verification. That, with the additional technique of displaying the records' object latitude and object longitude values on an x-y graph for human review, should permit the proper categorization of all records, according to the stationary objects observed, and assignment of a unique stationary object ID to all observation records in master reference database 72. The final database structure for master reference database 72 is shown in FIG. 3, with each record consisting of values for data items 46', 48', 50', 52', 54', 56', 58', 60', 30, 31, 32, 34, 36, 38, 40, 42, 43, 44, 45, 74, 76, and 78. As additional observations are gathered, they are processed as shown above and added to master reference database 72, which is maintained on a dedicated server and with support systems and procedures suitable for such large database applications.

Finally, reference database 23 can be created from master reference database 72, which will be done whenever a new stationary object is identified and sufficient data are available, when additional data are received that indicate that some important characteristic of the stationary object seems to have changed and the new information is properly validated, and on a periodic basis simply to take advantage of the better results made possible by larger amounts of data and data reduction/statistical analysis methods. In order to take advantage of such analytical methods, as well as to minimize the size of reference database 23, wherever possible data will be converted into equations of trendlines and accompanying measures of standard deviations to characterize the amount of "data scatter". First, a conversion is made to take advantage of the precise timing accuracy available from the sensor 14 electronics, as well as its accuracy and reliability in measuring relative speeds between itself and a stationary object which is being approached. For graphical as well as multiple regression purposes, it is useful to convert the two dimensions of latitude 46' and longitude 48' into a single measure of distance traveled by the host vehicle along its constrained path, Vehicle Travel Distance to Target, or VTDT 80. Each observation is generated by a fast Fourier transform (FFT) operation, with results being transmitted onto the data bus from sensor 14 on a very well-controlled basis. With sequentially-numbered FFT events, shown by FFT frame number 32, and values for precise time 52, it is possible to calculate elapsed times between receipt of sequential FFT frames with great accuracy. With those precise time values between observations, plus relative speed 38 observed for stationary object 12, which is really the closing speed of the host vehicle, it is possible to calculate the traveled distance between observations simply by the following equation: VTDT between successive sensor observations=(precise time at first observation−precise time at second observation)×relative speed. The approach for calculating values of VTDT for each observation point is to "backtrack" by starting with the last observation in the sequence and assigning its VTDT to be the detected distance to the stationary object at that closest point (which is the point at which the most accurate distance measurement to the stationary object is normally expected). Then, the VTDT is calculated for each of the earlier observations in turn, by calculating the VTDT between points as shown above, and adding that to the just-calculated observation's VTDT value. The result is that each observation point's VTDT value is a highly-accurate estimate of the distance the host vehicle would travel along its path before reaching the stationary object 12. (Since by definition, it is not actually in the vehicle's path, this is more precisely the distance the vehicle would travel if it deviated after the last observation it made of the object and headed directly to it.) This conversion provides perhaps the most accurate estimate of the vehicle's actual travel path distance that would be available, except possibly from centimeter-level GNSS techniques with position fixes at 15 to 20 times per second.

The next step is to perform an analysis to determine the polynomial equation which provides the "best fit" trendline for each of the observed stationary object characteristics versus VTDT, as well as to determine the standard deviation statistic as it varies with VTDT. The result for each characteristic is a polynominal equation that is a function of VTDT and derived constants. Assuming a third-order polynomial provides a good "best fit", then the equations for characteristics of distance to object 34, radar return magnitude 36, and azimuth angle 40 are:

Distance to object=$A1 \times (VTDT^3) + B1 \times (VTDT^2) + C1 \times (VTDT) + D1$ Distance to ob SD=$A2 \times (VTDT^3) + B2 \times (VTDT^2) + C2 \times (VTDT) + D2$ Radar return mag.=$A3 \times (VTDT^3) + B3 \times (VTDT^2) + C3 \times (VTDT) + D3$ Radar ret mag SD=$A4 \times (VTDT^3) + B4 \times (VTDT^2) + C4 \times (VTDT) + D4$ Azimuth angle=$A5 \times (VTDT^3) + B5 \times (VTDT^2) + C5 \times (VTDT) + D5$ Azimuth angle SD=$A6 \times (VTDT^3) + B6 \times (VTDT^2) + C6 \times (VTDT) + D6$ So, using a third-order polynomial equation to describe the trendline for a characteristic as related to VTDT, and another third-order polynomial equation to describe the possible change in those data's standard deviation with values of VTDT, allows only eight numbers to describe these relationships. As a result, a preferred embodiment of the present invention which utilizes the three stationary object characteristics of distance to object 34, radar return magnitude 36, and azimuth angle 40 can have those characteristics' relationships to position on the vehicle path VTDT 80 as it approaches the stationary object 12 fully described with only 24 values: A1, B1, C1, D1, A2, B2, C2, D2, A3, B3, C3, D3, A4, B4, C4, D4, A5, B5, C5, D5, A6, B6, C6, and D6. The remaining information necessary for reference database 23 that is necessary for real time operation of the present invention involves another conversion—how to convert the location data 28 provided by the vehicle locating device 18 on a real time basis into the VTDT coordinates used for the reference database 23 purposes. Once again, this information is derived from the observation data contained in master reference database 72. By performing a multiple regression of previous observations of latitude 46' and longitude 48' onto VTDT 80, the resulting relationship allows real time observations of the latitude 46 and longitude 48 to be converted into VTDT, which then permits calculation of trendline and standard deviation comparisons against characteristics being observed in real time with results from previous observations using similar sensors 14 from the same location on the vehicle path as the stationary object 12 was being approached. The resulting multiple regression formula takes the form of VTDT=$A + B \times \text{latitude} + C \times \text{longitude}$, so the relationship can be specified with the three constants A, B, and C. The resulting structure for reference database 23 is shown in FIG. 3, which is that the subset of database 23 which fully describes the necessary information for one stationary object 12 consists of the following 27 constant values: A, B, C, A1, B1, C1, D1, A2, B2, C2, D2, A3, B3, C3, D3 A4, B4, C4, D4, A5, B5, C5, D5, A6, B6, C6, and D6. These items, plus the latitude 46', longitude 48', and heading 54' from the first observation point in the master reference database 72 involving this particular stationary object 12, are stored in a file using the stationary object ID 78 as its name, to easily relate that file back to the observation records in the master reference database 72 from which it was derived. For example, a reference database 23 file for stationary object 12 with a stationary object ID 78 of 12345 would have a file name in the reference database of 12345.rdb, with the rdb extension name signifying that it is a member of the reference database. As will be explained more fully below, the reason for the inclusion of the latitude, longitude, and heading of the first observation point for a particular stationary object in its reference database file is to allow quick identification of two things—that it is valid for an area that includes the given latitude and longitude coordinates, and that it should be used on a real time basis when a vehicle is approaching the given latitude and longitude coordinates, and traveling in a direction consistent with the heading that is expected that the vehicle will be traveling when it reaches those coordinates.

Figure 4:
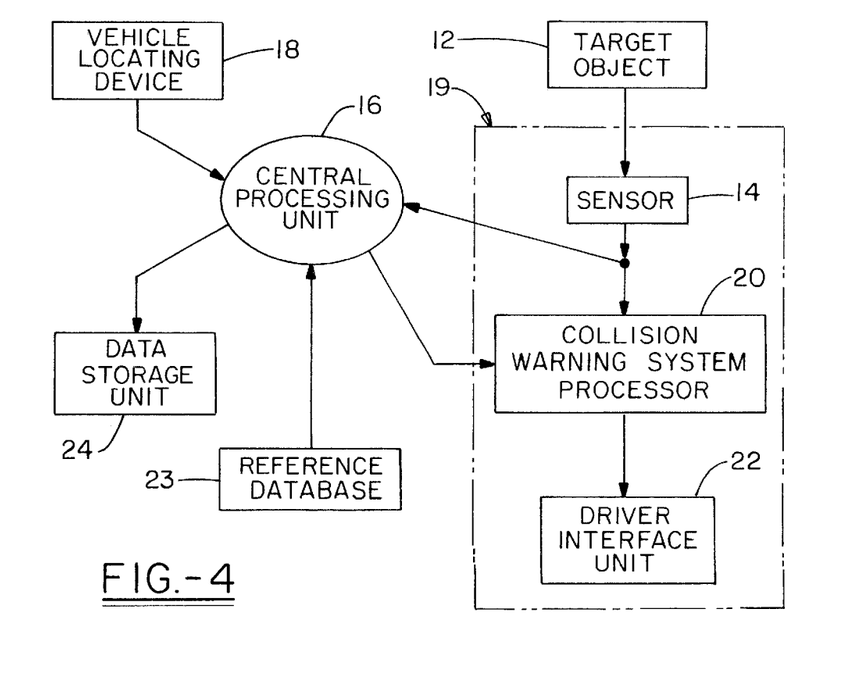
FIG. 4 is a block diagram of a driver alert system of the present invention.

Referring now to FIG. 4, the block diagram shows how the reference database 23 is used during normal operation. As in the creation of the reference database 23, the sensor 14 detects a target object 12. The sensor data 26 is sent to the CWP 20 and is also sent to the central processing unit 16. The vehicle locating device 18 sends vehicle location data 28 to the central processing unit 16. Each time that sensor data 26 is received by central processing unit 16, the sensor data 26 and location data 28 being captured real-time by the central processing unit 16 are compared to the recorded data from the reference database 23 for that highway segment, if any.

If no data exist for that highway segment and it is included in the routes evaluated, then a communication is sent immediately to the CWS that there is highest confidence that the object is not "road furniture" and an appropriate message will be sent from central processing unit 16 to CWP 20 to that effect, whose logic will take that into account in determining whether stationary alert and/or other actions should be taken immediately. In many cases, This will allow the CWS to sound a valid alert sooner than it would have, since it would normally wait until it was close enough to discount the possibility that overhead structures or objects along curves were being seen. If either had been the case, that segment of highway would have had data recorded for them; the absence of such data confirms that no such situation normally exists there.

Figure 5:
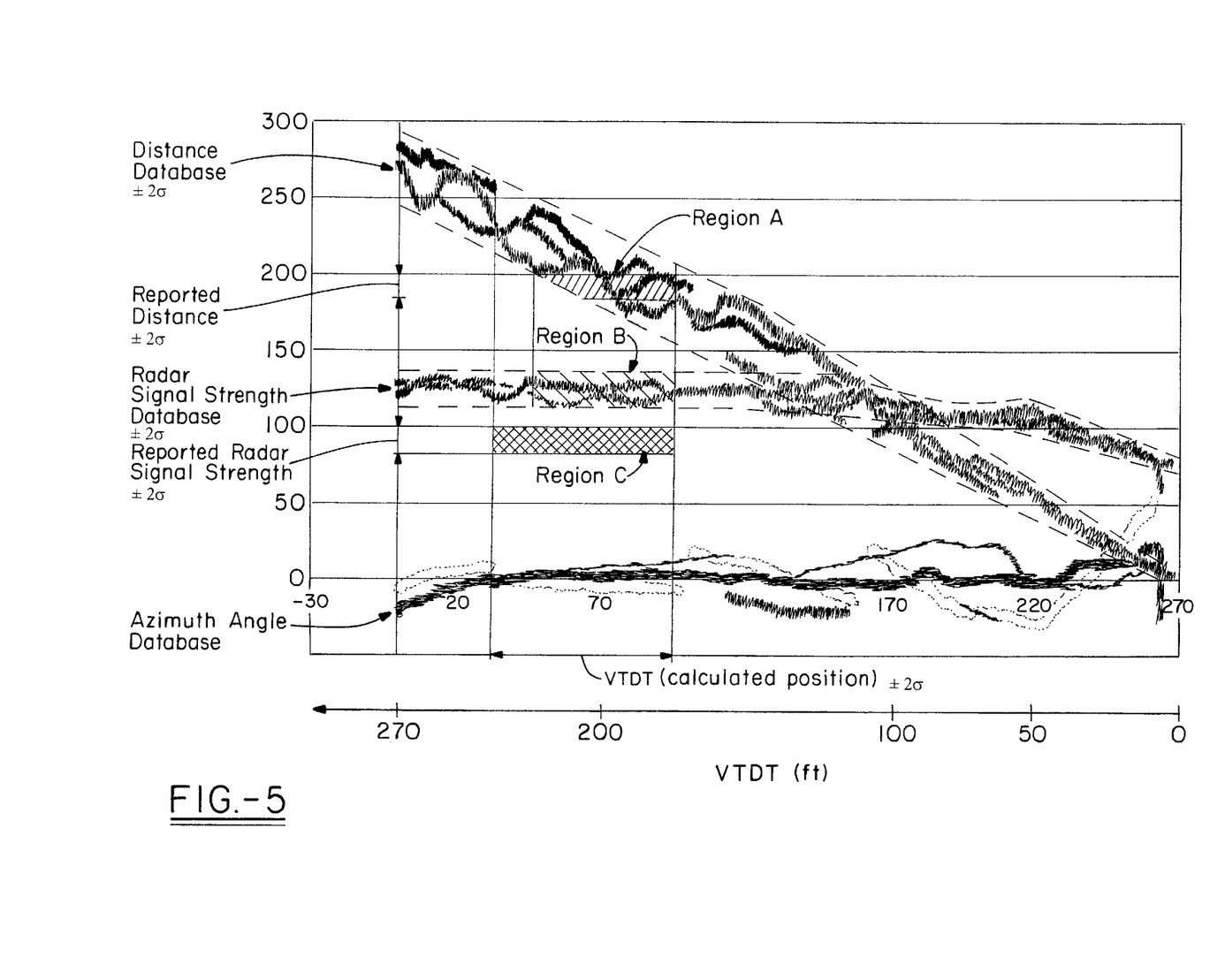
FIG. 5 is a graph illustrating the use of the reference database to evaluate the likelihood that a target object represents a danger of collision with a vehicle.

If data do exist for that highway segment, then the real-time data are compared with the recorded data as will be discussed in detail below. One method of the present invention is to calculate a probability whether detected object(s) are only normal stationary items positioned along the roadway which do not constitute a threat to the CWS host vehicle i.e., not one of those object plus additional stationary object (s) which do appear hazardous. However, a simpler approach, which also address the same situations, is used in a preferred embodiment, and is illustrated in FIG. 5.

The following process will start whenever the host vehicle approaches the section of roadway that corresponds to a datafile in the reference database. Referencing FIG. 4, the central processing unit 16 will retrieve from the reference database 23 the stored file for the next section of highway containing an object that could generate a nuisance alert by knowing where the vehicle is located and its heading, based on continual updates from the vehicle location device 18.

The central processing unit 16 will store data from the file in its active memory, for fast calculations as the vehicle reaches the same locations with data recorded in the file that was retrieved. As the vehicle is moving, its current location and heading as identified by vehicle locating device 18 are used to identify all files in reference database 23 which include data for paths which the host vehicle could be following, for each new sensor datapoint, the following process takes place. If, based on location, heading, and location accuracy as identified by vehicle locating device 18, there are multiple files identifying paths which the host vehicle could be following or about to follow, then the following process will be executed simultaneously for each of those reference database 23 files. For simplicity, the following illustrates the process using a single file from the reference 23 database. First, constants A 88, B 90, and C 92 are retrieved to be used with current latitude 46 and longitude 48, as determined from such data from recent location data 28 reported to the central processing unit 16 by the vehicle locating device 18, to calculate variable VDTD, using the equation VDTD=A×latitude+B×longitude+C. Referring now to FIG. 5, the position reported by the vehicle locating device 18 is shown on the x axis, along with its 2 standard deviation data distribution. For illustration, it is assumed that a Differential GPS system is in use, with a 2 standard deviation error of 10 meters. By locating the intersection of that range of location along the x axis, plus the range of reported distance for the current radar datapoint plus its 2 standard deviation distribution, and the 2 standard deviation distribution of the stored database for distance vs. position, Region A is generated. If there is no overlap, then the test based on a 2 standard deviation data distribution level fails at this point. If there is an overlap, as illustrated, then the next step is to transfer the Region A's x-axis range down to the stored database's 2 standard deviation distribution for magnitude versus position, which forms Region B. The last step is to create Region C by intersecting the reported magnitude plus its 2 standard deviation distribution with the reported position and its 2 standard deviation distribution, forming Region C. If there is no overlap between Region B and Region C, as is the case in this illustration, then the test based on a 2 standard deviation data distribution fails at this point. If there is overlap between Region B and Region C, then the test based on 2 standard deviation data distribution is passed.

In a preferred embodiment, the above evaluation is first done assuming a 1 standard deviation data distribution. The test is passed, then that result is reported as described elsewhere. However, if it is failed, then the test is repeated using a 2 standard deviation data distribution assumption. The same process is repeated up to a maximum of an 8 standard deviation assumption. If the test is never passed at that level, then a "maximum level exceeded" message is communicated rather than proceeding further. These results are called "stationary-object test" results.

Each time the test is run, the result is reported by the central processing unit 16 to the CWP 20 where the CWS logic will take the results of the test into account to determine its most appropriate action. In cases when a warning would have mistakenly been given ("nuisance alert") due to ordinary, non-hazardous highway infrastructure, the continued passing of the central processing unit's test at very low standard deviation data distribution levels may be used by the CWP 20 to suppress the nuisance alert, depending on the particular standard deviation data distribution level achieved by the test and the level required by the CWP 20 to withhold action. In a preferred embodiment, further statistics from the reference database 23 file being used for the analysis are also communicated from the central processing unit 16 to the CWP 20, which may also be taken into account by the CWP's logic which determines appropriate actions to take regarding possible alerts and/or other actions. In other cases when a warning would have been delayed during detection of an object believed to be in the vehicle's path, but far enough away to possibly be a bridge or other structure that could trigger a higher level of nuisance alerts, if the test is passed at only high standard deviation data distribution levels, then the detected stationary object may be unusual and the CWP 20 may choose to initiate action earlier than it would otherwise have done.

The general concept is that the stored reference database of sensor data and location data for non-hazardous stationary objects along a specific stretch of roadway provides a "truth table" with multiple variables to use for attempting to discern whether a stationary object detected along the same stretch of highway appears with some degree of likelihood to be the same object whose radar data were recorded because a nuisance alert could normally be sounded by the particular type of CWS. More than mere location is needed, to help discern the situation of finding both the expected stationary object and some hazardous object in much the same location. This could easily occur with stalled cars under bridges, in tunnels, or even parked in the roadway close enough to a guardrail, tree, or other stationary object whose location could be recorded in the database. By utilizing the strength of the radar return, which will vary with the objects being illuminated by the beam as well as their respective radar cross-sections, as well as distance and azimuth angle from the radar's point of view along the entire stretch of roadway approaching the object, the ability to differentiate a hazardous situation with an unexpected stationary object in the roadway near a stationary object recorded in the database, is greatly enhanced.

Results of the stationary-object tests at various confidence levels are communicated via the data link to the CWS, with each related to the specific object and timeframe that were evaluated. The CWS will be designed to modify its standalone alert/action logic to factor in these stationary-object test.

The database will need to be updated as changes are made to the highway infrastructure, to prevent "aging" of the performance improvement that this invention will provide the CWS and other related systems. There are a variety of methods available for updating the database. For databases where the full database is on a permanent storage medium, these can be updated with replacement media substituted for original media in customer's vehicle on as-needed or periodic basis (e.g., DVD disk replaced by updated disk)

Another technique involves supplementing the database employing a permanent storage medium, updated with database files transmitted by wireless communication to the host vehicle (e.g., DVD disk augmented with files transmitted to the vehicle and stored in temporary but nonvolatile memory, until updated DVD replaces existing one). It is also contemplated that the wireless link is also used to collect data from the customer's vehicles to identify potential database updates and perhaps to gather enough data to create the database updates, which are then transmitted to appropriate vehicles.

In a further technique, all needed database files are transmitted via wireless communication to host vehicle, where they are stored in temporary but nonvolatile memory and the most-current location-specific files transmitted to the host vehicle in advance of time that they will be needed. The wireless link may also be used to collect data from the customer's vehicles to identify potential database updates and perhaps to gather enough data to create the database updates, which are then transmitted to appropriate vehicles.

It is also contemplated, and is a preferred embodiment of the present invention, that the wireless communication link to customer host vehicles can operate through an Internet web site, which distributes needed database files to customer vehicles and also serves as e-commerce link for various database-related sales transactions and offering other opportunities of potential interest to the customer base. The Internet web site similarly could be used to collect data from the customer's vehicles for database updates. With such an approach, communication procedures will be utilized to maximize the customer's privacy with regard to vehicle location, unless such privacy is explicitly waived by the customer.

It is also contemplated that, in addition to communicating results of the evaluation as described above and illustrated in FIG. 5 to the CWP 20 for use as described, that such results are also used to determine when it would be useful to provide information to identify the location of any stationary objects 12 whose results of said evaluation make them appear to be unusual. In such case, it is a preferred embodiment of the present invention to provide such information on a timely basis to improve the driver's situation awareness of the forward driving environment.

As can be seen, the present invention provides a method of utilizing the current state of the art sensor technology, and is adaptable to include improvements in next generation sensors as the cost makes these more available. There are an innumerable amount of methods available to utilize the data obtained by the present invention to calculate probabilities to determine whether a stationary object is indeed a nuisance alert. Review of several features universal to all the embodiments must be noted. First, the invention can be adapted for use with any sensor based object detection system, such as CWS, CAW and/or ACC system. The primary difference between the different CWS, CAW and/or ACC systems is the type of sensor, modulation techniques and signal direction techniques employed. The invention enhances the performance of any of these systems by providing a reference database of sensor and location data generally obtained with the same type system as which it is currently deployed.

Secondly, while the configuration of the invention can be designed to be integral to the CWS and/or ACC system, the invention can also be a stand alone unit added to an existing CWS and/or ACC system.

Third, the present invention is not limited to automobiles, but can be used on any land-based vehicles. These land-based vehicles include, but are not limited to, mobile machines such as mining machines, heavy construction machines and robots, whether manned or unmanned; on road vehicles such as heavy trucks, busses, passenger cars, minivans, light trucks and specialty vehicles (snowplow, emergency, etc.); and off-road vehicles such as heavy vehicles (military trucks, etc.), light vehicles (all-terrain vehicles, etc.), and others such as tracked vehicles (tanks, etc.).

Finally, the present invention is not limited by the sensor direction and/or range. Although preferred embodiments of the invention have been described herein, various modifications or variations will be apparent to one skilled in the art without departing from the principles and teachings herein. Accordingly, the invention is not to be limited to the specific embodiments illustrated, but is only intended to be limited by the scope of the appended claims.

What is claimed is:

1. A process to develop a reference database in conjunction with a system for stationary object detection, comprising the steps of:

1) acquiring signals from at least one sensor, said sensor capable of sensing target objects and generating data related to said target objects;

2) storing said data from said at least one sensor in a storage device;

3) determining the location of said at least one sensor;

4) indexing said target object data with respect to at least said sensor location for subsequent comparison to real time data acquired from at least one sensor located on a mobile machine or vehicle to evaluate whether said real time data indicates the presence of a normally-present stationary object;

5) acquiring data from a vehicle locating device associated with said vehicle as said vehicle travels along a path providing said data from said at least one sensor to a collision warning or avoidance system associated with said vehicle, said collision warning or avoidance system generating signals indicating a possible collision of said vehicle with an obstacle;

6) monitoring the signals from said collision warning or avoidance system to a man-machine interface; and 7) permanently capturing said data from said at least one sensor and said vehicle locating device in response to a stationary target warning message from said collision warning or avoidance system to said man-machine interface wherein said stationary target warning message relates to a non-collision situation or nuisance alert.

2. The process of claim 1 wherein said process is repeated more than once and includes a final step of combining the data from at least one sensor and said vehicle locating device from said path at a location which generated a nuisance alert in a manner increasing the confidence in said data.

3. A process of creating a reference database comprising:

1) obtaining sensor data of stationary target objects using at least one sensor device mounted on a vehicle;

2) obtaining vehicle location data using a vehicle location device;

3) recording said sensor data and said vehicle location data for a selected time period within which a stationary object nuisance alert is generated by a vehicle collision warning or avoidance system;

4) repeating steps 1–3 with a vehicle having at least one similar sensor; and 5) creating a database of sensor data relating to stationary objects detected along segments of vehicle paths where nuisance alerts relating to stationary objects were generated.

4. The method of claim 3 wherein said sensor data of a target object comprises a target number, a fast Fourier transform number, a distance to the target, an azimuth angle to the target, a magnitude of sensor return and a quality indicator.

5. The method of claim 3, wherein said vehicle location data comprises a latitude, a longitude, a heading, a velocity and a time.

6. A process to develop a database in conjunction with a collision avoidance or warning system using a predetermined type of sensor, comprising the steps of:

1) acquiring signals from at least one sensor corresponding to the predetermined type of sensor, said predetermined type of sensor capable of sensing target objects and generating data related to said target objects;
2) storing said data from said at least one sensor;
3) determining the location of said at least one sensor; and
4) indexing said target object data with respect to at least said sensor location for subsequent use as a preexisting reference database by a collision avoidance or warning system to optimize performance of the collision avoidance or warning system by comparison of real time data acquired from the at least one type of sensor with stored data from said predetermined type of sensor to at least decrease nuisance alerts from the collision avoidance or warning system.

7. The process according to claim 6, wherein data relating to normally-present stationary objects is indexed to sensor location and heading of the vehicle on which sensor data was obtained.

8. The process according to claim 6, wherein data relating to normally-present stationary objects is indexed to a calculated absolute location of a normally-present stationary object.

9. The process according to claim 6, wherein said at least one sensor comprises a radar-based sensor.

10. The process according to claim 9, wherein said at least one sensor comprises a radar-based sensor selected from the group consisting of a FSK Doppler-based radar sensor, a pulse Doppler sensor, a FMCW ramp sensor or combinations thereof.

11. The process according to claim 6, wherein said sensor location data is selected from the group consisting of location coordinates, time, heading, velocity or combinations thereof.

12. The process according to claim 6, wherein location data is provided by a satellite-based locating system.

13. The process according to claim 6, wherein location data is provided by a global positioning system.

14. The process according to claim 6, wherein stored data further comprises at least one of the following group of data comprising distance to said at least one stationary object, azimuth angle to said at least one stationary object, the magnitude of a detected signal relating to at least one stationary object, the elevation angle to said at least one stationary object, the width of said at least one stationary object, the height of said at least one stationary object of combinations thereof.

15. The process according to claim 6, wherein said stored sensor data further comprises at least the magnitude of a detected signal.

16. The process according to claim 6, wherein only data relating to normally-present stationary objects are stored which either: 1) generate a stationary-object nuisance alert from an associated collision avoidance or warning system; or 2) could generate a stationary-object nuisance alert according to predetermined logic; or 3) appear to be in or near the path of the vehicle as determined according to preexisting information on the location of the path; or 4) could cause a true stationary-object alert to be missed or delayed, according to predetermined logic.

17. The process according to claim 6, wherein said process is repeated more than once and includes a final step of combining the data from said at least one sensor and said sensor location for a selected geographic area in a manner increasing the confidence in said data.

18. The process according to claim 17, wherein the step of combining the data comprises deriving the relationship between sensed stationary-object data and sensor location and storing data related to derived relationships and statistical measures of the relationships in a reference database to be used in conjunction a vehicle collision avoidance or warning system to improve performance of the collision avoidance or warning system.

19. The process according to claim 18, wherein the relationships comprise at least signal return strength as a function of sensor location.

20. The process according to claim 18, wherein the relationships comprise at least sensor-reported distance to stationary object as a function of sensor location.

21. The process according to claim 18, wherein the relationships are polynomial functions of sensor location.

22. The process according to claim 18, wherein the sensor location is expressed as vehicle-travel distance to stationary object.

23. The process according to claim 18, wherein the sensor location is expressed as one or more position coordinates within a roadway lane.

24. The process according to claim 18, wherein the wherein sensor location is expressed as one or more position coordinates without respect to roadway or lane position.

25. A process to develop a reference database in conjunction with a system with at least one outward-looking sensor for stationary object detection and warning, for subsequent use as a preexisting database for comparison to real time data acquired from at least one similar outward-looking sensor located on a mobile machine or vehicle to evaluate whether said real time data indicates the presence of a normally-present stationary object, comprising the steps of:

1) acquiring signals from at least one outward-looking sensor mounted on a mobile machine or vehicle, said at least one sensor capable of sensing target objects and generating data related to said target objects;
2) determining the location of said at least one sensor;
3) indexing said target object data with respect to location of said at least one sensor;
4) storing said position-indexed target object data in a storage device;
5) providing, as said mobile machine or vehicle travels along a path, said target object data from said at least one sensor to collision warning logic associated with said mobile machine or vehicle, said collision warning logic generating signals indicating a possible collision of said vehicle with a stationary object;
6) monitoring the signals from said collision warning logic; and
7) if said collision warning logic generates a stationary-object collision warning, then permanently capturing from the storage device said position-indexed target object data for all detected objects for the entire time period that the target object responsible for said collision warning had data captured by said at least one sensor.

26. The process of claim 25, wherein said process is repeated more than once by the same or other mobile machines or vehicles having similar outward-looking sensors and collision warning logic, over substantially the same path where location-indexed stationary object data were captured, and includes a final step of combining said location-indexed stationary object data in a manner increasing the confidence in said data.

27. A reference database formed with the process of any one of claims 1, 2, 3, 4, 5, 6, 7, 8, 9, 10, 11, 12, 13, 14, 15, 16, 17, 18, 19, 20, 21, 22, 23, 24, 25, 26.

28. The reference database according to claim 27, wherein said data records are stored on a replaceable permanent storage medium, wherein said database is updated by replacing said permanent storage medium with an updated version.

29. The reference database according to claim 27, wherein said data are transmitted to a storage medium located on a vehicle by wireless communication.

\* \* \* \* \*